United States Patent
Yasuda et al.

(10) Patent No.: US 11,554,716 B1
(45) Date of Patent: Jan. 17, 2023

(54) SYSTEMS AND METHODS FOR RECOMMENDING A STEERING ANGLE USING VISUAL FEEDBACK ON A WHEEL

(71) Applicant: Toyota Research Institute, Inc., Los Altos, CA (US)

(72) Inventors: Hiroshi Yasuda, San Francisco, CA (US); Manuel Ludwig Kuehner, Mountain View, CA (US); Guillermo Pita Gil, Redwood City, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/714,585

(22) Filed: Apr. 6, 2022

(51) Int. Cl.
*B60Q 3/283* (2017.01)
*B60Q 3/80* (2017.01)
*B62D 15/02* (2006.01)
*B62D 1/06* (2006.01)

(52) U.S. Cl.
CPC .............. *B60Q 3/283* (2017.02); *B60Q 3/80* (2017.02); *B62D 1/06* (2013.01); *B62D 15/029* (2013.01)

(58) Field of Classification Search
CPC . B60Q 3/283; B60Q 3/80; B62D 1/06; B62D 15/029
See application file for complete search history.

(56) References Cited

U.S. PATENT DOCUMENTS

| | | |
|---|---|---|
| 7,414,520 B2 | 8/2008 | Meißner |
| 7,679,495 B2 | 3/2010 | Beutnagel-Buchner et al. |
| 8,103,410 B2 | 1/2012 | Hatano et al. |
| 8,482,430 B2 * | 7/2013 | Szczerba ............ G01C 21/3626 340/459 |
| 9,481,297 B2 | 11/2016 | Salter et al. |
| 10,414,439 B2 | 9/2019 | Spencer et al. |
| 10,632,904 B2 | 4/2020 | Kato |
| 10,754,029 B2 | 8/2020 | Talamonti et al. |

(Continued)

FOREIGN PATENT DOCUMENTS

KR 20000033374 A 6/2000

OTHER PUBLICATIONS

Wikipedia, "Weber-Fechner Law", Accessed on Apr. 4, 2022, Retrieved from https://en.wikipedia.org/wiki/Weber%E2%80%93Fechner_law#Fechner's_law, 10 pages.

(Continued)

*Primary Examiner* — Jason M Han
(74) *Attorney, Agent, or Firm* — Christopher G. Darrow; Darrow Mustafa PC

(57) ABSTRACT

System, methods, and other embodiments described herein relate to providing visual feedback on a steering apparatus using a pscyhophysical model. In one embodiment, a method includes obtaining a difference between a current angle of a steering apparatus and a recommended angle of the steering apparatus. The method further includes determining an appearance parameter based upon the difference and a psychophysical model, wherein the psychophysical model optimizes a relationship between perceived light and the difference such that a change in the difference produces a proportional change in the perceived light. The method further includes illuminating a region of the steering apparatus with light based upon the appearance parameter.

20 Claims, 14 Drawing Sheets

(56) References Cited

U.S. PATENT DOCUMENTS

| | | |
|---|---|---|
| 11,208,037 B2 | 12/2021 | Lisseman et al. |
| 2009/0093930 A1 | 4/2009 | Hatano et al. |
| 2011/0187518 A1 | 8/2011 | Strumolo et al. |
| 2014/0244115 A1 | 8/2014 | Sanma et al. |
| 2018/0336329 A1 | 11/2018 | Walford |
| 2021/0039715 A1 | 2/2021 | Ferrer et al. |

OTHER PUBLICATIONS

Cadillac, "Super Cruise—Hands Free Driving", Accessed on Apr. 4, 2022, Retrieved from https://www.cadillac.com/world-of-cadillac/innovation/super-cruise, 9 pages.

* cited by examiner

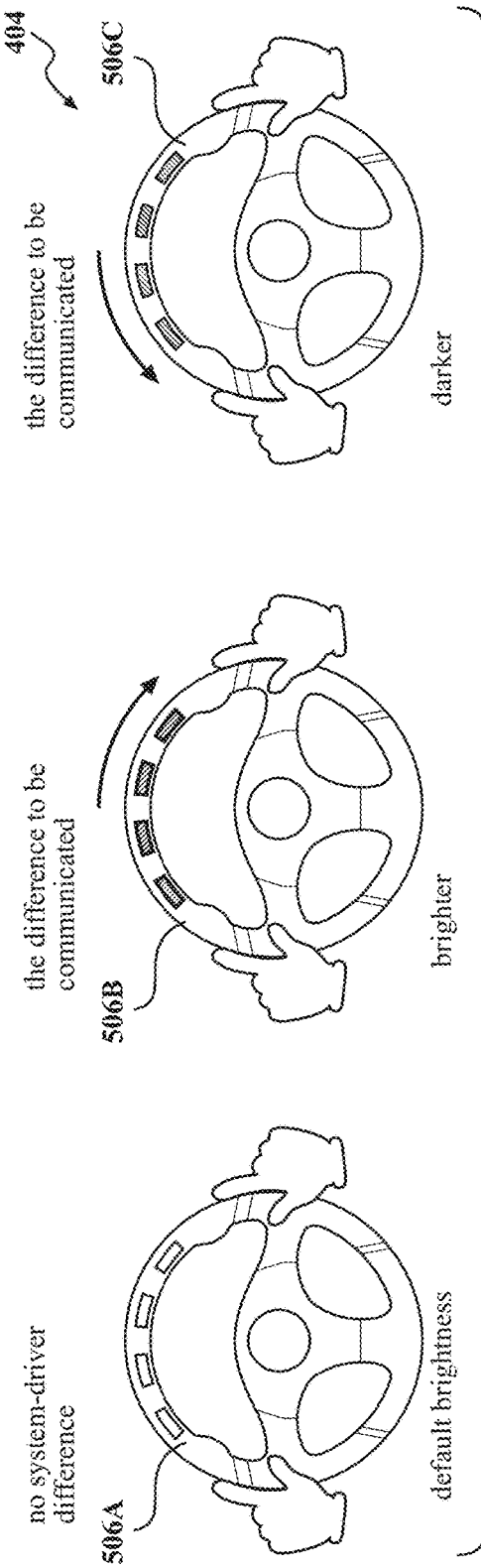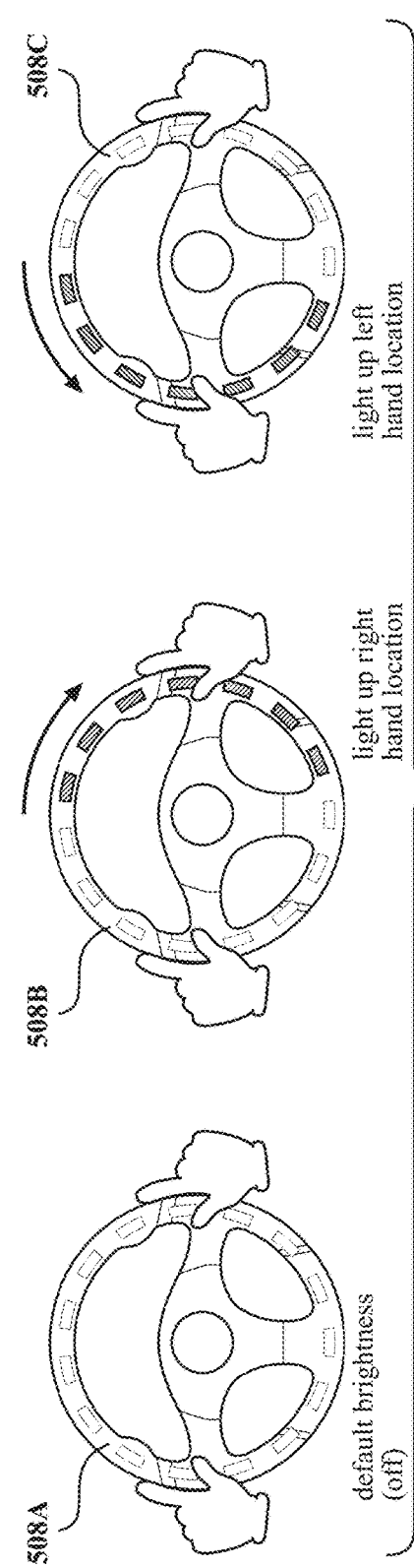

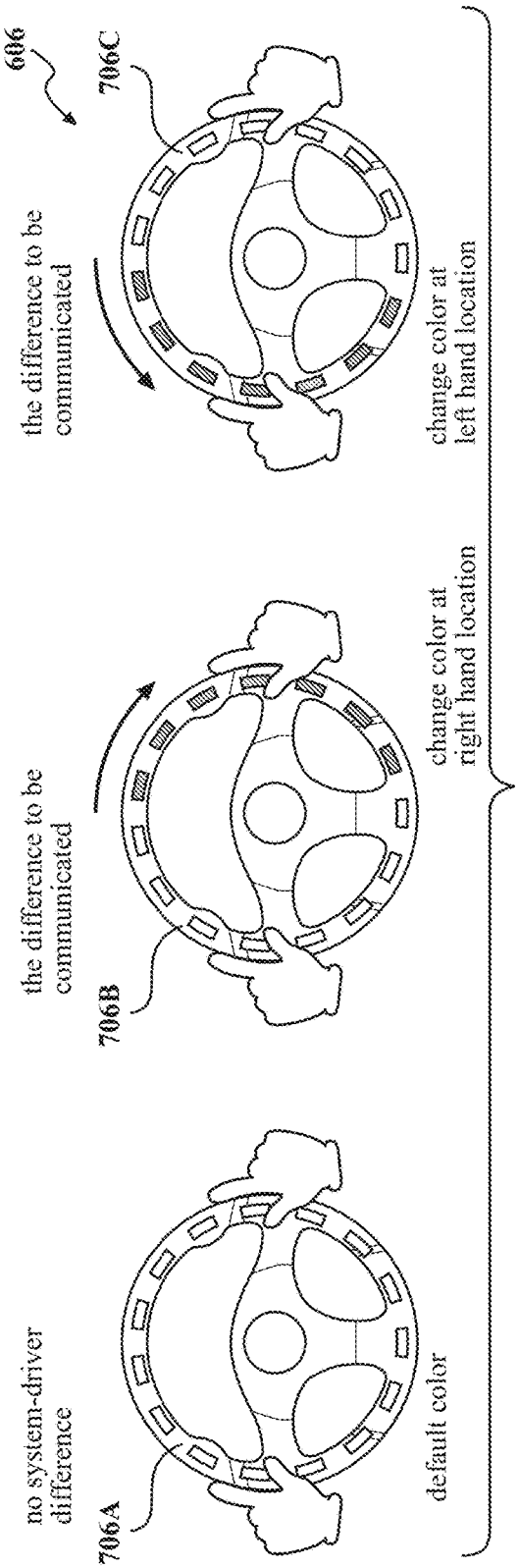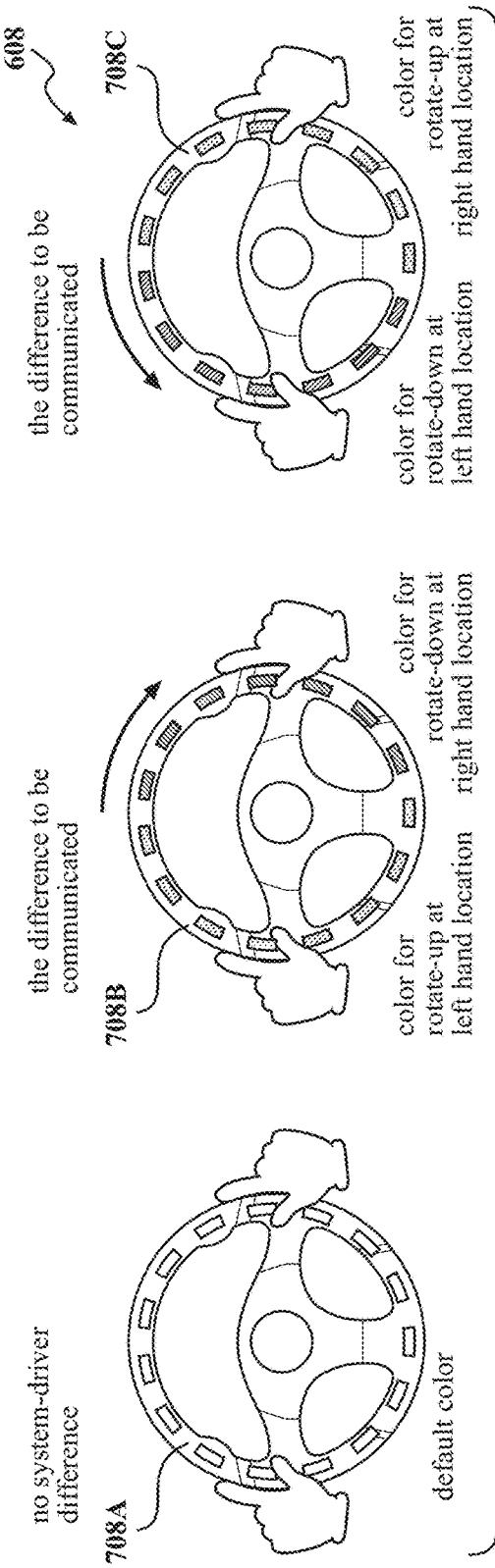

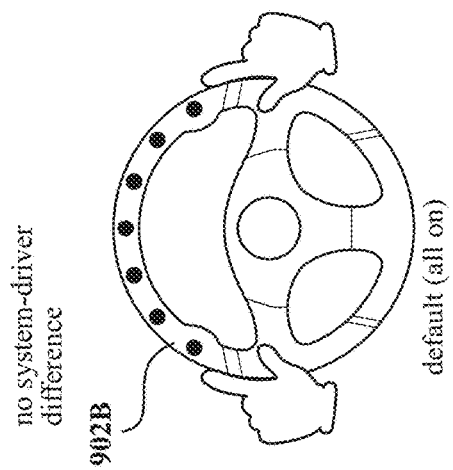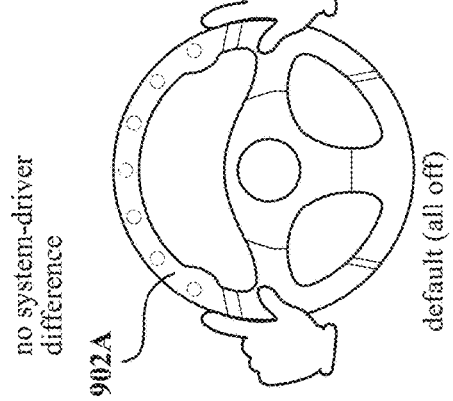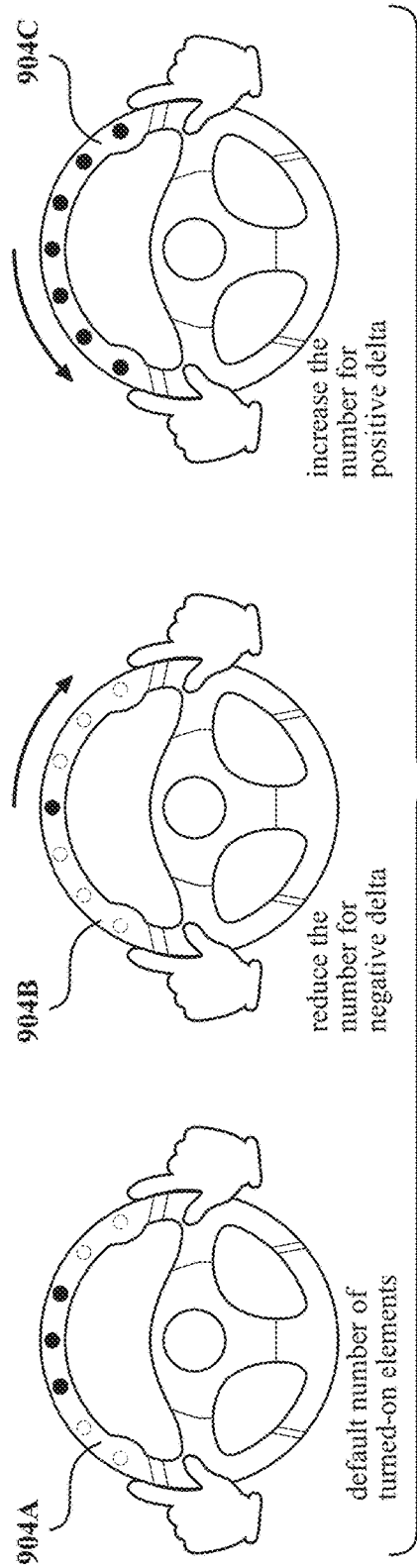
FIG. 9A
FIG. 9B

SYSTEMS AND METHODS FOR RECOMMENDING A STEERING ANGLE USING VISUAL FEEDBACK ON A WHEEL

TECHNICAL FIELD

The subject matter described herein relates, in general, to providing visual feedback on a steering apparatus, and, more particularly, to utilizing a psychophysical model to provide the visual feedback.

BACKGROUND

A vehicle may be equipped with systems that provide an operator of the vehicle with driving instructions and/or recommendations. For instance, the driving instructions/recommendations may enable the vehicle to be operated by the operator such that the vehicle follows a route and/or avoids an obstacle as the vehicle navigates about an environment. Conventional systems for providing driving instructions/recommendations may present information to the operator in a manner that distracts the operator from looking at the road. Additionally, conventional systems tend to be deficient with respect to communicating precise driving instructions/recommendations to the operator of the vehicle. Furthermore, conventional systems tend not to account for factors that influence perception of the driving instructions/recommendations by the operator.

SUMMARY

An example visual feedback system for communicating a recommended steering angle change through visual cues on a steering apparatus is described herein. In one embodiment, the visual feedback system obtains a difference between a current angle of a steering apparatus and a recommended angle of the steering apparatus. The visual feedback system determines an appearance parameter(s) (e.g., hue, lightness, brightness, chroma, colorfulness, or saturation) based upon the difference and a psychophysical model. The psychophysical model optimizes a relationship between perceived light and the difference such that a change in the difference produces a proportional change in the perceived light. The visual feedback system illuminates a region of the steering apparatus with light based upon the appearance parameter. In an example, the visual feedback system activates one or more lighting elements in the region such that the one or more lighting elements emit the light, where an operator of the vehicle perceives the light as having the appearance parameter(s) in order to communicate the difference to the operator. For instance, when the difference is relatively large, the one or more lighting elements may emit relatively bright light, whereas when the difference is relatively small, the one or more lighting elements may emit relatively dim light. In this manner, the visual feedback system is able to visually inform the operator of the difference in a precise manner that is based upon human perception.

In one embodiment, a computing system for providing visual feedback on a steering apparatus of a vehicle is disclosed. The computing system comprises a processor and memory communicably coupled to the processor. The memory stores instructions that, when executed by the processor, cause the processor to obtain a difference between a current angle of the steering apparatus and a recommended angle of the steering apparatus. The instructions further cause the processor to determine an appearance parameter based upon the difference and a psychophysical model stored in the memory, wherein the psychophysical model optimizes a relationship between perceived light and the difference such that a change in the difference produces a proportional change in the perceived light. The instructions further cause the processor to illuminate a region of the steering apparatus with light based upon the appearance parameter.

In one embodiment, a non-transitory computer-readable medium for providing visual feedback on a steering apparatus of a vehicle and including instructions that, when executed by a processor, cause the processor to perform one or more functions is disclosed. The instructions cause the processor to obtain a difference between a current angle of the steering apparatus and a recommended angle of the steering apparatus. The instructions further cause the processor to determine an appearance parameter based upon the difference and a psychophysical model, wherein the psychophysical model optimizes a relationship between perceived light and the difference such that a change in the difference produces a proportional change in the perceived light. The instructions further cause the processor to illuminate a region of the steering apparatus with light based upon the appearance parameter.

In one embodiment, a method is disclosed. The method includes obtain a difference between a current angle of a steering apparatus and a recommended angle of the steering apparatus. The method further includes determine an appearance parameter based upon the difference and a psychophysical model, wherein the psychophysical model optimizes a relationship between perceived light and the difference such that a change in the difference produces a proportional change in the perceived light. The method further includes illuminate a region of the steering apparatus with light based upon the appearance parameter.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 5A-D illustrate the different variants of recommending a steering angle change detailed in FIG. 4.

FIGS. 7A-D illustrate the different variants of recommending a steering angle change detailed in FIG. 6.

FIGS. 9A-D illustrate the different variants of recommending a steering angle change detailed in FIG. 8.

DETAILED DESCRIPTION

Figure 1:
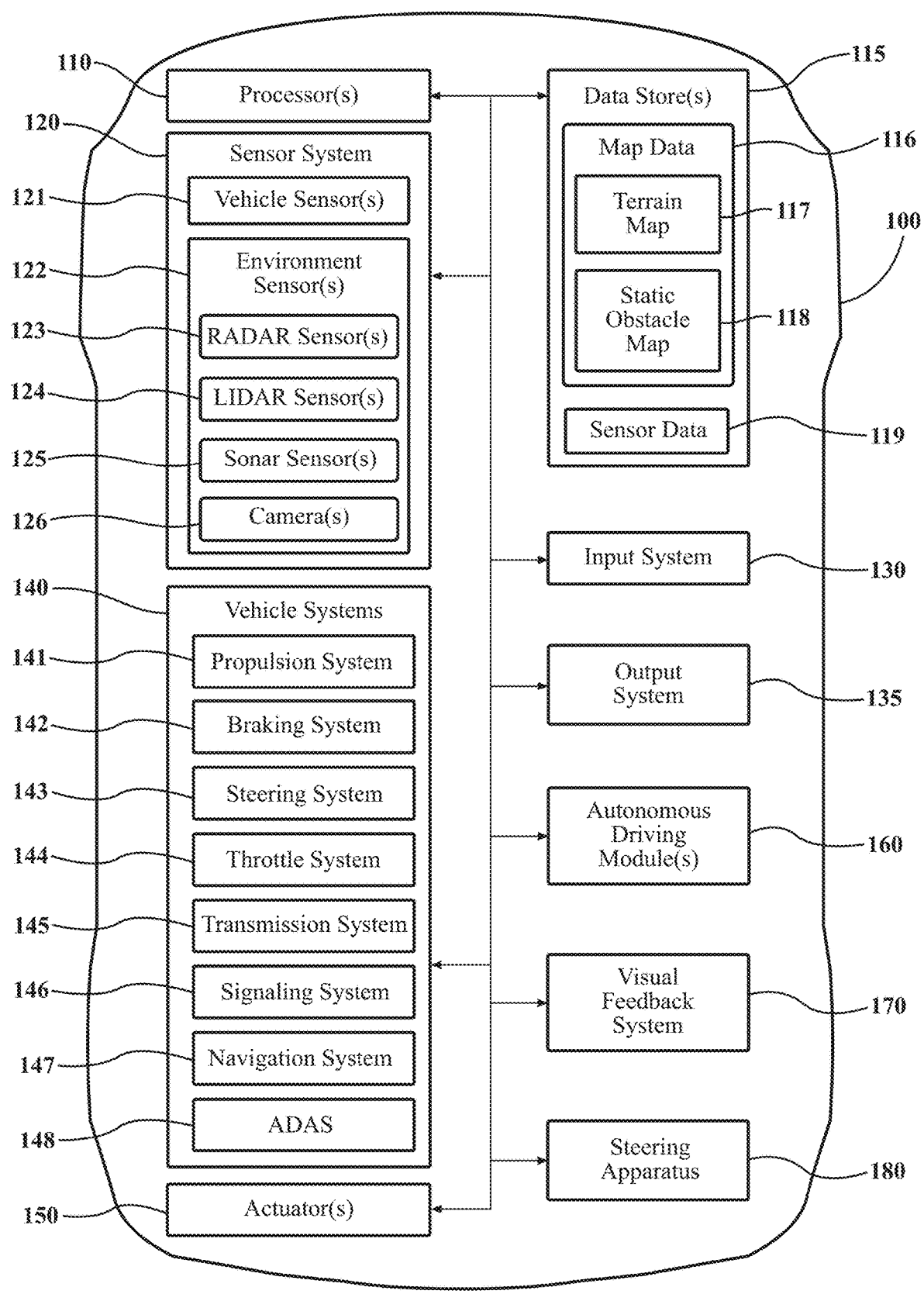
FIG. 1 illustrates one embodiment of a vehicle within which systems and methods disclosed herein may be implemented.

Systems, methods, and other embodiments associated with improving a manner in which a recommended steering angle is communicated to an operator of a vehicle are disclosed herein. As noted above, conventional systems for providing driving instructions/recommendations to an operator of a vehicle tend to struggle between providing precise driving instructions/recommendations while at the same time presenting the driving instructions/recommendations to the operator in an easily understandable manner. Furthermore, conventional systems may present driving instructions/recommendations in a distracting manner. Additionally, human perception with respect to color and/or brightness is non-uniform with respect to perceptual contrasts. In an example, a system may cause a lighting element to emit first light of a first wavelength and/or first amplitude to convey a driving instruction/recommendation that involves rotating a steering apparatus from a first angle to a second angle. The operator perceives the first light as having a first brightness and/or a first color, but the operator does not perceive the first brightness/color as being different than a default brightness/color associated with default light emitted by the lighting element, even though the light and the default light have different wavelengths and amplitudes. Hence, the operator may not implement the driving instruction/recommendation as the operator does not perceive a change with respect to emitted light. In another example, a system may cause the lighting element to emit second light of a second wavelength and/or second amplitude to convey a driving instruction that involves rotating a steering apparatus from the first angle to the second angle. The operator perceives the second light as having a second brightness/color that is highly different than the default brightness/color, and hence the operator may "over-implement" the driving instruction/recommendation by rotating the steering apparatus from the first angle to a third angle, where the third angle is greater than the second angle. As such, a system that provides visual feedback without regard to human perception may inaccurately convey a driving instruction/recommendation to an operator of a vehicle.

To address these problems, an improved visual feedback system that utilizes a psychophysical model to provide visual feedback that is optimized for human perception is described herein. In one embodiment, the system obtains a current angle of a steering apparatus of a vehicle from sensor data generated by a steering angle sensor of the steering apparatus. The system also obtains a recommended steering angle of the steering apparatus. In an example, the visual feedback system obtains the recommended steering angle from a navigation system and/or an advanced driver assistance-system (ADAS) of the vehicle. As such, the recommended steering angle may be associated with a maneuver that would cause the vehicle to follow a route to a destination and/or avoid an obstacle in the vicinity of the vehicle. The system determines a difference between the current angle of the steering apparatus and the recommended angle of the steering apparatus.

The system determines at least one appearance parameter (e.g., hue, lightness, brightness, chroma, colorfulness, saturation) based upon the difference and a psychophysical model. The psychophysical model optimizes a relationship between perceived light and the difference such that a change in the difference produces a proportional change in the perceived light. In an example, the psychophysical model is a perceptually uniform color map. According to embodiments, the vehicle includes an ambient light sensor that generates sensor data that is indicative of an ambient light level in a cabin of the vehicle. According to embodiments, the system determines the appearance parameter additionally based upon the sensor data.

The system illuminates a region of the steering apparatus with light based upon the appearance parameter in order to communicate the difference, that is, in order to communicate a driving instruction/recommendation. For instance, the system may activate light emitting diodes (LEDs) comprised by the steering apparatus, where the LEDs emit the light. In an example, the operator perceives the light as having a color and/or brightness that communicates a magnitude and/or sign of the difference. In another example, a number of LEDs activated communicates the magnitude and/or sign of the difference. According to embodiments, the system obtains a position of a hand of the operator based upon sensor data output by a hand position sensor associated with the steering apparatus. According to the embodiments, the system selects the region based upon the position of the hand. According to embodiments, the system selects the region based upon a sign of the difference.

It is contemplated that the system reacts in real-time to changes in a steering angle of the steering apparatus. In an example, the steering apparatus may be angled at a first angle, a second angle, and a third angle, where the second angle is between the first angle and the third angle. In the example, the current angle of the steering apparatus is initially the first angle and the recommended angle of the steering apparatus is the third angle. The system determines a first difference between the first angle (i.e., the current angle) and the third angle (i.e., the recommended angle), determines a first appearance parameter based upon the first difference and the psychophysical model as described above, and illuminates the region with first light based upon the first appearance parameter. When the steering apparatus is rotated from the first angle to the second angle, the system determines a second difference between the second angle (i.e., the current angle) and the third angle (i.e., the recommended angle), determines a second appearance parameter based upon the second difference and the psychophysical model as described above, and illuminates the region with second light based upon the second appearance parameter. In an example, the operator of the vehicle perceives the first light as having a first brightness/color and the second light as having a second brightness/color that is perceivably different than the first brightness/color due to the use of the psychophysical model.

The above-described present various advantages over conventional technologies that provide driving instructions to an operator of a vehicle. First, as the visual feedback system provides visual cues on the steering apparatus that are observable in the peripheral vision of the operator, the visual feedback system is able to communicate maneuver-related information to the operator without requiring the operator to look away from the road. Second, through use of the psychophysical model described above, the visual feedback system helps to ensure that the operator of the vehicle precisely implements driving instructions/recommendations such that the vehicle is not over-steered or under-steered by accounting for human perception of light. Third, by utilizing sensor data that is indicative of an ambient light level of a cabin of the vehicle in conjunction with the psychophysical model, the above-described technologies help to ensure that the operator precisely implements driving instructions/recommendations even when lighting conditions in the vehicle change.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with improving driving instructions/recommendations provided to an operator of the vehicle 100. As a further note, this disclosure generally discusses the vehicle 100 as traveling on a roadway with surrounding vehicles, which are intended to be construed in a similar manner as the vehicle 100 itself. That is, the surrounding vehicles can include any vehicle that may be encountered on a roadway by the vehicle 100.

The vehicle 100 also includes various elements, such as a steering system 143, a navigation system 147, an advanced-driver assistance system (ADAS) 148, and a visual feedback system 170. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-10 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes the visual feedback system 170 that is implemented to perform methods and other functions as disclosed herein relating to improving communication of a recommended steering angle by utilizing a psychophysical model to optimize a relationship between the recommended steering angle and human perception of the recommended steering angle. The vehicle 100 also includes the steering apparatus 180. As will be discussed in greater detail subsequently, the visual feedback system 170, in various embodiments, is implemented partially within the vehicle 100, and as a cloud-based service. For example, in one approach, functionality associated with at least one module of the visual feedback system 170 is implemented within the vehicle 100 while further functionality is implemented within a cloud-based computing system.

Figure 2:
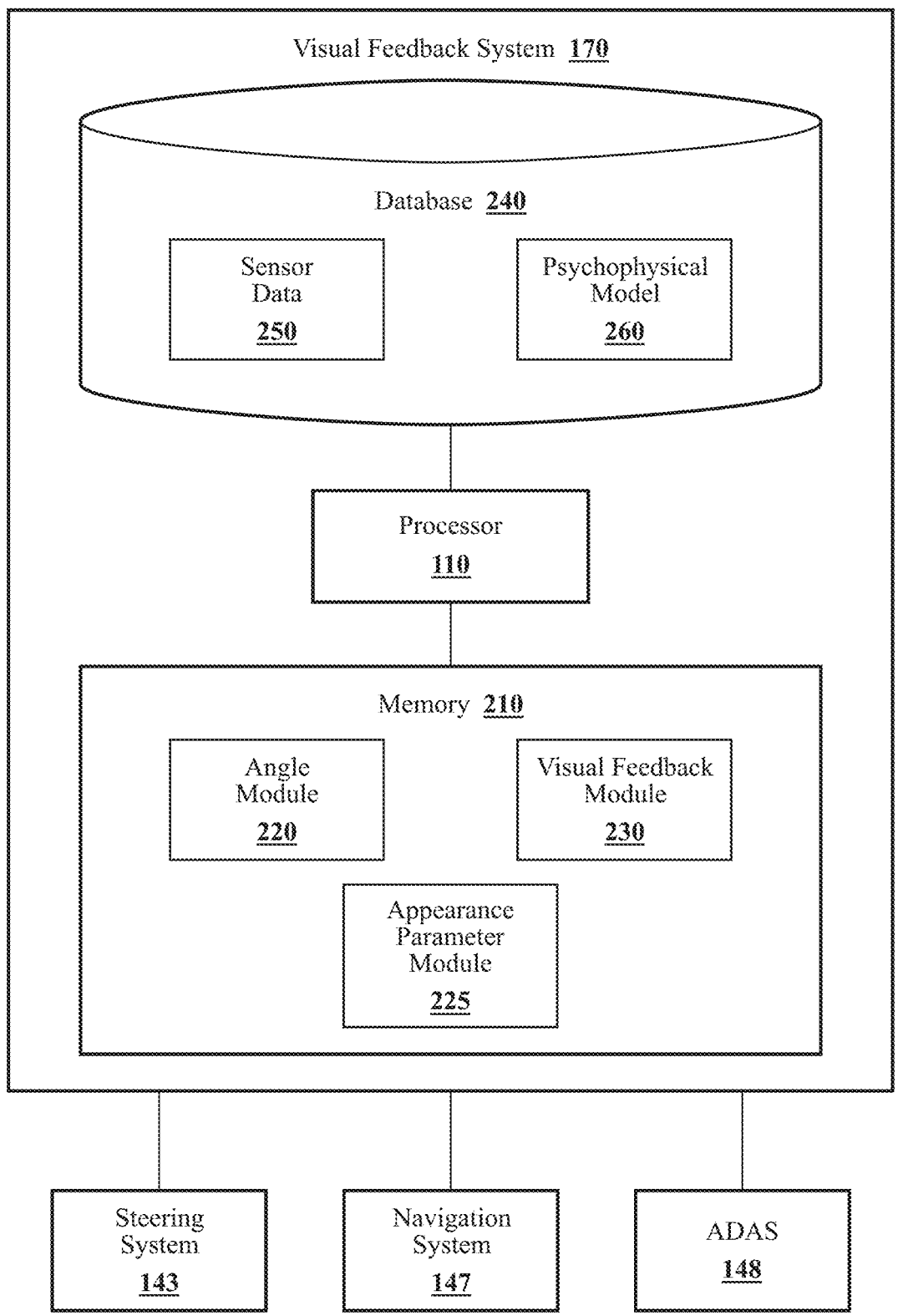
FIG. 2 illustrates one embodiment of a visual feedback system that is associated with recommending a steering angle change using a psychophysical model.

With reference to FIG. 2, one embodiment of the visual feedback system 170 of FIG. 1 is further illustrated. The visual feedback system 170 is shown as including a processor 110 from the vehicle 100 of FIG. 1. Accordingly, the processor 110 may be a part of the visual feedback system 170, the visual feedback system 170 may include a separate processor from the processor 110 of the vehicle 100, or the visual feedback system 170 may access the processor 110 through a data bus or another communication path. In one embodiment, the visual feedback system 170 includes a memory 210 that stores an angle module 220, an appearance parameter module 225, and a visual feedback module 230. The memory 210 is a random-access memory (RAM), read-only memory (ROM), a hard-disk drive, a flash memory, or other suitable memory for storing the angle module 220, the appearance parameter module 225, and the visual feedback module 230. The angle module 220, the appearance parameter module 225, and the visual feedback module 230 are, for example, computer-readable instructions that when executed by the processor 110 cause the processor 110 to perform the various functions disclosed herein.

The visual feedback system 170 as illustrated in FIG. 2 is generally an abstracted form of the visual feedback system 170 as may be implemented between the vehicle 100 and a cloud-computing environment. According to embodiments, the visual feedback system 170 is embodied at least in part within the cloud-computing environment.

With reference to FIG. 2, the angle module 220 generally includes instructions that function to control the processor 110 to receive data inputs from one or more sensors of the vehicle 100 and/or from one or more of the vehicle systems 140. As will be described in greater detail below, the angle module 220 is generally configured to obtain a current angle of the steering apparatus 180 and a recommended angle of the steering apparatus 180. The angle module 220 is also configured to determine a different between the current angle of the steering apparatus 180 and the recommended angle of the steering apparatus 180.

The appearance parameter module 225 generally includes instructions that function to control the processor 110 to receive data inputs from the angle module 220. As will be described in greater detail below, the appearance parameter module 225 is generally configured to determine an appearance parameter based upon the difference and a psychophysical model 260.

The visual feedback module 230 generally includes instructions that function to control the processor to receive data input from the appearance parameter module 225. As will be described in greater detail below, the visual feedback module 230 is generally configured to cause a region of the steering apparatus 180 to be illuminated with light based upon the appearance parameter received from the appearance parameter module 225.

According to embodiments, the visual feedback system 170 may be incorporated into the navigation system 147 and/or the ADAS 148. The visual feedback system 170 is in communication with a steering system 143 of the vehicle 100. The visual feedback system 170 may also be in communication with the navigation system 147 and/or the ADAS 148.

Moreover, in one embodiment, the visual feedback system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the visual feedback module 220, the appearance parameter module 225, and/or the visual feedback module 230. In one embodiment, the database 240 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on.

In one embodiment, database 240 includes the psychophysical model 260. The psychophysical model 260 optimizes a relationship between perceived light and a difference between a current angle of the steering apparatus 180 and a recommended angle of the steering apparatus 180 such that a change in the difference produces a proportional change in the perceived light. According to embodiments, the psychophysical model 260 comprises a perceptually uniform color map, where a given numerical change corresponds to a similarly perceived change in color.

Figure 3:
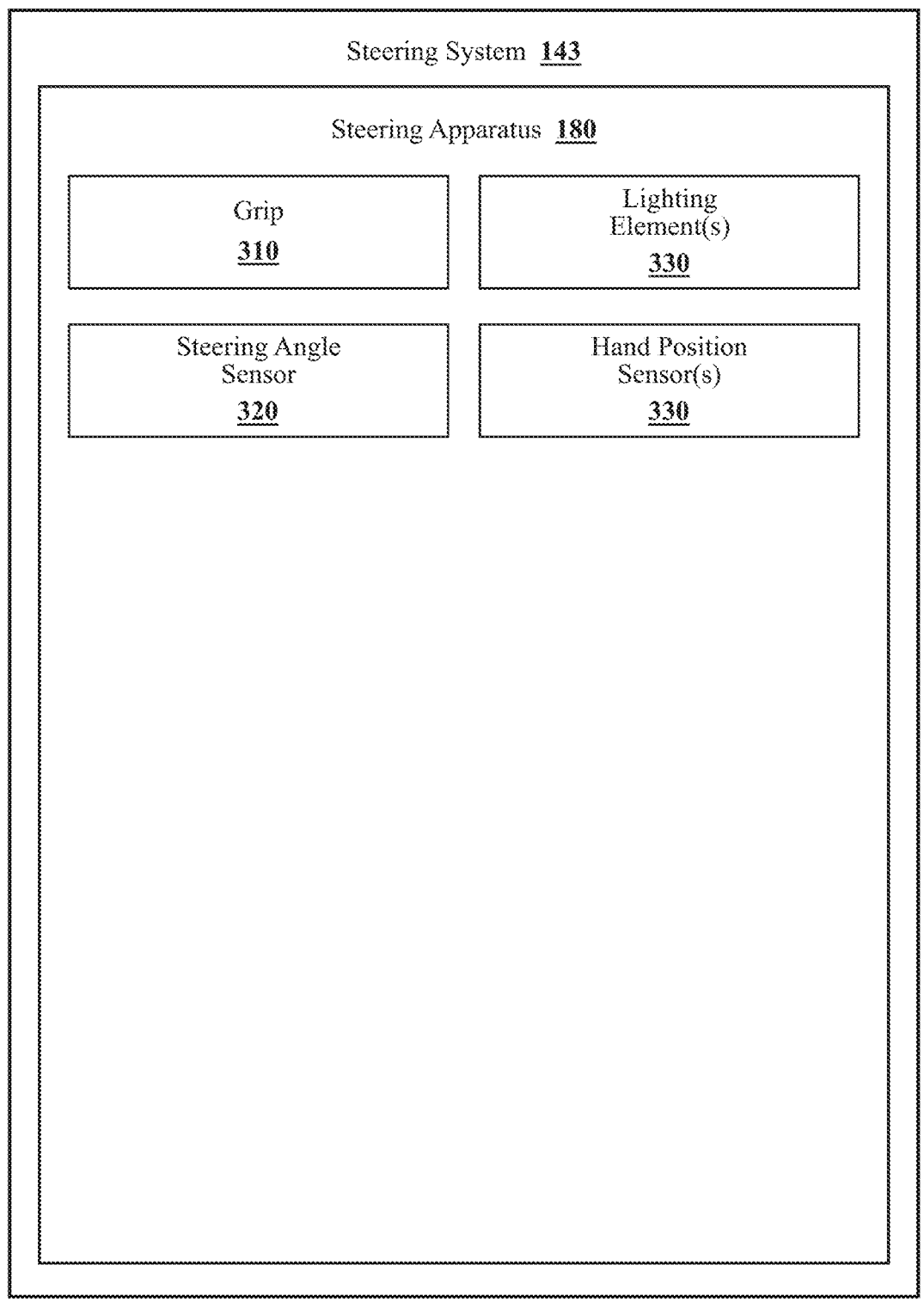
FIG. 3 illustrates one embodiment of a steering apparatus.

Referring now to FIG. 3, a functional block diagram of an example of the steering apparatus 180 is depicted. In general, the steering apparatus 180 is configured to be operated by an operator of the vehicle 100. When the steering apparatus 180 is rotated, the steering system 143 causes a trajectory of the vehicle 100 to be altered based upon a direction and magnitude of the rotation. According to embodiments, the steering apparatus 180 is a steering wheel.

The steering apparatus 180 includes a grip 310 that is gripped by one or more hands of the operator of the vehicle 100. According to embodiments, the grip 310 is a circular or substantially circular ring. The steering apparatus 180 may include spokes (e.g., one spoke, two spokes, three spokes, etc.) that connect different portions of the grip 310 to one another. Various controls may be located on the spokes.

The steering apparatus 180 further includes a steering angle sensor 320 that is configured to generate sensor data that is indicative of a current angle of the steering apparatus 180. In an example, when the vehicle 100 is travelling straight, the steering angle sensor 320 generates sensor data indicating that the current angle of the steering apparatus 180 is 0°.

According to embodiments, the steering apparatus 180 includes one or more lighting elements 330 (referred to herein as "the lighting elements 330" for ease of reading) that are configured to emit light in one or more colors and/or at one or more intensity levels. In an example, the lighting elements 330 are configured to emit light in accordance with one or more appearance parameters such that the operator perceives the light as having a desired hue, lightness, brightness, chroma, colorfulness, and/or saturation. The lighting elements 330 may also be configured to emit light according to different patterns. According to some embodiments, the lighting elements 330 are disposed within the grip 310. According to embodiments, each of the lighting elements 330 represents an angle. According to some embodiments, the lighting elements 330 include thirty-six lighting elements that are arranged radially throughout the grip 310, where each lighting element represents a 10° angle. According to some embodiments, the lighting elements 330 are light emitting diodes (LEDs). According to embodiments, some of the lighting elements 330 may be disposed within the spokes of the steering apparatus 180.

According to embodiments, the one or more lighting elements 330 are a single circular lighting element that is disposed within the grip 310. Different regions of the single circular lighting element may be selectively activated/deactivated.

Although the lighting elements 330 are depicted in FIG. 3 as being a part of the steering apparatus 180, other possibilities are contemplated. According to embodiments, the lighting elements 330 are mounted in an interior of the vehicle 100 (other than on the steering apparatus 180). According to the embodiments, the lighting elements 330 emit light onto a region of the grip 310 of the steering apparatus 180. The light reflects off of the region of the grip 310 and is then perceived by an operator of the vehicle 100.

The steering apparatus 180 may include one or more hand position sensors 340 (referred to herein as the "hand position sensors 340" for ease of reading). The hand position sensors 340 are generally configured to generate sensor data that is indicative of a position of one or more hands of the operator of the vehicle 100 on the grip 310. The hand position sensors 340 may also be configured to generate sensor data that indicative of a size of the one or more hands of the operator of the vehicle 100 on the grip 310. The hand positions sensors 340 may further be configured to generate sensor data that is indicative of a number of hands (e.g., one or two) of the operator on the grip 310. The hand position sensors 340 may be disposed within the grip 310. According to embodiments, the hand position sensors 340 are capacitive touch sensors, force-based sensors, or optical sensors.

Although the hand position sensors 340 are depicted in FIG. 3 as being a part of the steering apparatus 180, other possibilities are contemplated. According to embodiments, the hand position sensors 340 include one or more cameras that are disposed in an interior of the vehicle 100. The one or more cameras are configured to capture an image of the one or more hands of the operator of the vehicle 100 on the grip 310. The visual feedback system 170 may determine a number, a size, and/or a position of the one or more hands of the operator on the grip 310 based upon the image.

Example operation of the visual feedback system 170 is now set forth. It is contemplated that the vehicle 100 is being operated by an operator (also referred to as a driver). The angle module 220 obtains a current angle of the steering apparatus 180 based upon sensor data generated by the steering angle sensor 320. The angle module 220 also obtains a recommended angle of the steering apparatus 180. The angle module 220 determines a difference between the current angle of the steering apparatus 180 and the recommended angle of the steering apparatus 180.

According to some embodiments, the angle module 220 obtains the recommended angle of the steering apparatus 180 from the navigation system 147. In an example, the recommended angle is part of a maneuver that enables the vehicle 100 to follow a route to a destination. According to some embodiments, the angle module 220 obtains the recommended angle of the steering apparatus 180 from the ADAS 148. In an example, the recommended angle is part of a maneuver that enables the vehicle 100 to avoid an obstacle on a road, such as a pedestrian, a cyclist, another vehicle, an animal, etc. In another example, the recommended angle is part of a parking maneuver, such as parallel parking. In yet another example, the recommended angle is part of a lane change maneuver. According to some embodiments, the angle module 220 determines the recommended angle based upon sensor data generated by the sensor systems 120 of the vehicle 100.

The appearance parameter module 225 obtains the difference from the angle module 220. The appearance parameter module 225 determines an appearance parameter based upon the difference and the psychophysical model 260. The psychophysical model 260 optimizes a relationship between perceived light and the difference such that a change in the difference (e.g., a 1° change) produces a proportional change in the perceived light from the perspective of the operator of the vehicle 100. The appearance parameter includes one or more of hue, lightness, brightness, chroma, colorfulness, or saturation.

According to embodiments, the appearance parameter module 225 determines a Red Green Blue (RGB) value based upon the difference, such as a RGB hexadecimal value. According to the embodiments, the appearance parameter module 225 determines the appearance parameter based upon the RGB value and the psychophysical model 260.

The visual feedback module 230 obtains the appearance parameter from the appearance parameter module 225. The visual feedback module 230 illuminates a region of the steering apparatus 180 with light that is based upon the appearance parameter. For instance, the visual feedback module 230 may transmit data to the steering system 143. The steering system 143 transmits a signal based upon the data, where the signal causes the lighting elements 330 to emit the light, where the light is perceived by the operator as having the appearance parameter (e.g., hue, lightness, etc.). In an example in which the lighting elements 330 are LEDs, the signal causes the LEDs to emit the light.

In one example, a perceived color of the light is indicative of a sign and/or a magnitude of the difference. In another example, a perceived brightness of the light is indicative of the sign and/or magnitude of the difference. In yet another example, a perceived number of lighting elements that emit the light are indicative of the sign and/or magnitude of the difference.

In an example, subsequent to the region of the steering apparatus 180 being illuminated with the light, the angle module 220 determines that the steering apparatus 180 has been rotated such that the current angle is now the recommended angle. In the example, the visual feedback module 230 unilluminates the region based upon the current angle now being the recommended angle in order to inform the operator that the operator is now following a driving instruction/recommendation.

According to embodiments, the appearance parameter module 225 obtains sensor data that is indicative of an ambient light level within a cabin of the vehicle 100. According to the embodiments, the visual feedback module 230 illuminates the region of the steering apparatus 180 additionally based upon the sensor data that indicative of the ambient light level within the cabin of the vehicle 100.

It is contemplated that the visual feedback system 170 reacts in real-time to steering angle changes implemented by the operator of the vehicle 100 such that the appearance parameter varies as the steering apparatus 180 is rotated from the current angle to the recommended angle. In an example, the steering apparatus 180 is rotated from the current angle to a second current angle, where the second current angle is located between the current angle and the recommended angle. Using the processes described above, the appearance parameter module 225 obtains a second difference between the second current angle of the steering apparatus 180 and the recommended angle from the angle module 220. Using the processes described above, the appearance parameter module 225 determines a second appearance parameter based upon the second difference and the psychophysical model 260, where the second appearance parameter differs from the appearance parameter. The visual feedback module 230 illuminates the region of the steering apparatus 180 with second light based upon the second appearance parameter.

According to embodiments, the light is associated with a first set of points defined by a first tolerance contour within a color space, such as a Commission Internationale de l'Elcairage (CIE) color space. Each point in the first set of points is associated with first colors that are not perceivably different from one another. The second light is associated with a second set of points defined by a second tolerance contour within the color space. Each point in the second set of points is associated with second colors that are not perceivably different from one another. In an example, the first tolerance contour makes contact with the second tolerance contour within the color space such that no perceivably different color exists between the first colors and the second colors. In this manner, the visual feedback system 170 helps to precisely communicate driving instructions/recommendations to the operator.

According to embodiments, the visual feedback module 230 selects the region of the steering apparatus 180 based upon a sign (e.g., a positive sign or a negative sign) of the difference. According to embodiments, the visual feedback module 230 selects the region based upon a position of a hand (or hands) of the operator, where the visual feedback module 230 determines the position of the hand based (or hands) based upon sensor data generated by the hand position sensor 330.

FIGS. 4, 5A-D, 6, 7A-D, 8, and 9A-D detail various embodiments of the visual assistance system 170 and the steering apparatus 180.

Figure 4:
FIG. 4 illustrates a table that details different variants of recommending a steering angle change using different brightnesses.

With reference now to FIG. 4, a table 400 is illustrated which details various embodiments of the visual assistance system 170 and the steering apparatus 180 in which brightness of one or more regions of the steering apparatus 180 is changed to communicate a difference between a current steering angle and a recommended steering angle. It is to be understood that the psychophysical model 260 as described above is utilized to determine the brightness for each of the various embodiments.

In a first embodiment 402, the visual assistance system 170 utilizes an absolute value of a difference (referred to in FIG. 4 as "delta") between a current angle and a recommended angle of the steering apparatus 180, distribution of lighting on the steering apparatus 180 is independent of a sign of the difference, and brightness is changed in one direction. In a second embodiment 404, the visual assistance system 170 utilizes the difference (including the sign of the difference) between the current angle and the recommended angle of the steering apparatus 180, the distribution of lighting on the steering apparatus 180 is independent of the sign of the difference, and the brightness is changed in two directions. In a third embodiment 406, the visual assistance system 170 utilizes the difference (including the sign of the difference) between the current angle and the recommended angle of the steering apparatus 180, the distribution of lighting on the steering apparatus 180 is location-specific, and the brightness is changed in one direction. In a fourth embodiment 408, the visual assistance system 170 utilizes the difference (including the sign of the difference) between the current angle and the recommended angle of the steering apparatus 180, the distribution of lighting on the steering apparatus 180 is location-specific, and the brightness is changed in two directions.

Figure 5A:
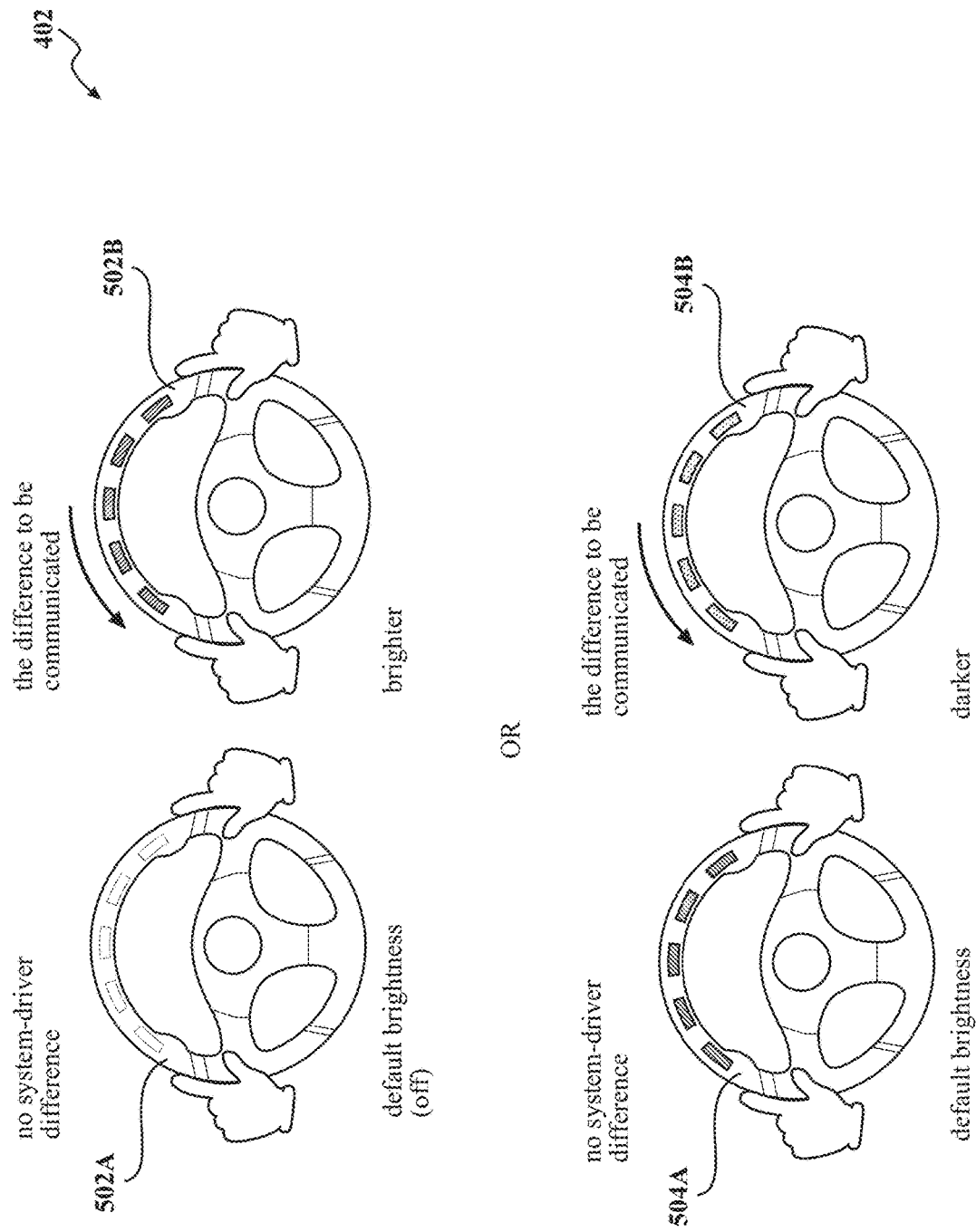

Turning now to FIG. 5A, the steering apparatus 180 according to the first embodiment 402 is illustrated. In a first example at 502A, when the current angle and the recommended angle of the steering apparatus 180 are the same (i.e., the difference is 0°) or within a threshold range of one another, the visual feedback module 230 turns off the lighting elements 330 of the steering apparatus 180. In the first example at 502B, when the current angle and the recommended angle of the steering apparatus 180 are not the same (i.e., the difference is non-zero) or are not within the threshold range of one another, the visual feedback module 230 causes the lighting elements 330 on the steering apparatus 180 to be illuminated to indicate the difference via a change in brightness. In a second example at 504A, when the current angle and the recommended angle of the steering apparatus 180 are the same (i.e., the difference is 0°) or within the threshold range of one another, the visual feedback module 230 causes the lighting elements 330 to be illuminated at a default brightness. In the second example at 504B, when the current angle and the recommended angle of the steering apparatus 180 are not the same (i.e., the difference is non-zero) or are not within the threshold range of one another, the visual feedback module 230 causes the lighting elements 330 to be illuminated at a brightness that is different than the default brightness.

Turning now to FIG. 5B, the steering apparatus 180 according to the second embodiment 404 is illustrated. At 506A, when the current angle and the recommended angle of the steering apparatus 180 are the same (i.e., the difference is 0°) or within a threshold range of one another, the visual feedback module 230 causes the lighting elements 330 to be illuminated at a default brightness. At 506B, when the difference has a first sign (e.g., a positive sign), the visual feedback module 230 causes the lighting elements 330 to be illuminated at a first brightness, where the first brightness is greater than the default brightness. At 506C, when the difference has a second sign (e.g., a negative sign), the visual feedback module 230 causes the lighting elements 330 to be illuminated at a second brightness, where the second brightness is less than the default brightness. Alternatively, the first brightness may be less than the default brightness and the second brightness may be greater than the first brightness.

Turning now to FIG. 5C, the steering apparatus 180 according to the third embodiment 406 is illustrated. At 508A, when the current angle and the recommended angle of the steering apparatus 180 are the same (i.e., the difference is 0°) or within a threshold range of one another, the visual feedback module 230 turns off the lighting elements 330 of the steering apparatus 180. At 508B, when the difference has a first sign (e.g., a positive sign), the visual feedback module 230 causes first lighting elements in a first region of the steering apparatus 180 to be illuminated at a first brightness. At 508C, when the difference has a second sign (e.g., a negative sign), the visual feedback module 220 causes second lighting elements in a second region of the steering apparatus 180 to be illuminated at the first brightness. The visual feedback module 230 selects the first region and/or the second region based upon a sign of the difference. The first light elements and the second lighting elements are included in the light elements 330.

Figure 5D:
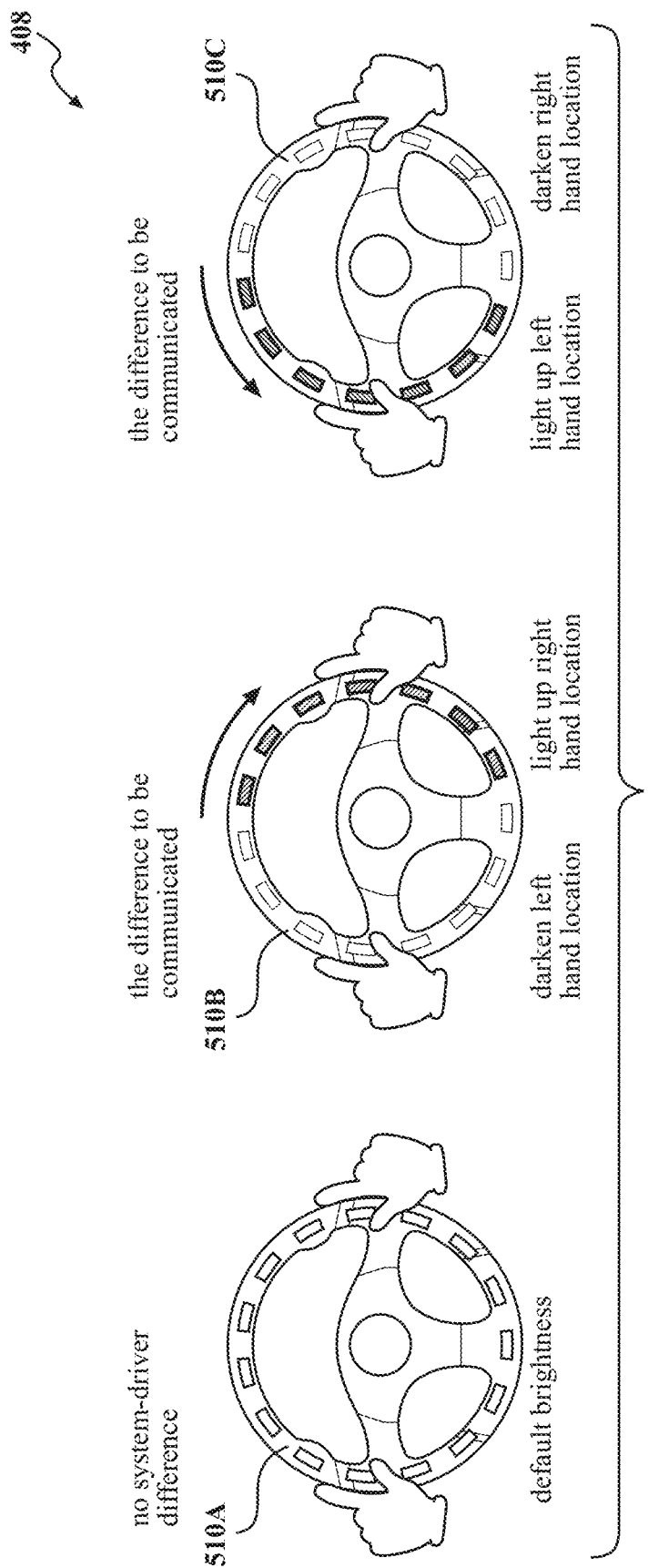

Turning now to FIG. 5D, the steering apparatus 180 according to the fourth embodiment 408 is illustrated. At 510A, when the current angle and the recommended angle of the steering apparatus 180 are the same (i.e., the difference is 0°) or within a threshold range of one another, the visual feedback module 230 causes the lighting elements 330 to be illuminated at a default brightness. At 510B, when the difference has a first sign (e.g., a positive sign), the visual feedback module 230 causes first lighting elements in a first region of the steering apparatus 180 to be illuminated at a first brightness and second lighting elements in a second region of the steering apparatus 180 to be illuminated at a second brightness, where the first brightness is less than the default brightness and where the second brightness is greater than the default brightness. At 510C, when the difference has a second sign (e.g., a negative sign), the visual feedback module 230 causes the first lighting elements in the first region of the steering apparatus 180 to be illuminated at the second brightness and the second lighting elements in the second region of the steering apparatus 180 to be illuminated at the first brightness. The visual feedback module 230 selects the first region and the second region based upon a sign of the difference. The first lighting elements and the second lighting elements are included in the lighting elements 330.

Figure 6:
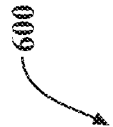
FIG. 6 illustrates a table that details different variants of recommending a steering angle change using different colors.

With reference now to FIG. 6, a table 600 is illustrated which details various embodiments of the visual assistance system 170 and the steering apparatus 180 in which color of one or more regions of the steering apparatus 180 is changed to communicate a difference between a current steering angle and a recommended steering angle. It is to be understood that the psychophysical model 260 as described above is utilized to determine the color for each of the various embodiments.

In a first embodiment 602, the visual assistance system 170 utilizes an absolute value of a difference (referred to in FIG. 6 as "delta") between a current angle and a recommended angle of the steering apparatus 180, distribution of lighting on the steering apparatus 180 is independent of a sign of the difference, and color is changed in one direction. In a second embodiment 604, the visual assistance system 170 utilizes the difference (including the sign of the difference) between the current angle and the recommended angle of the steering apparatus 180, the distribution of lighting on the steering apparatus 180 is independent of the sign of the difference, and the color is changed in two directions. In a third embodiment 606, the visual assistance system 170 utilizes the difference (including the sign of the difference) between the current angle and the recommended angle of the steering apparatus 180, the distribution of lighting on the steering apparatus 180 is location-specific, and color is changed in one direction. In a fourth embodiment 608, the visual assistance system 170 utilizes the difference (including the sign of the difference) between the current angle and the recommended angle of the steering apparatus 180, the distribution of lighting on the steering apparatus 180 is location-specific, and color is changed in two directions.

Figure 7A:
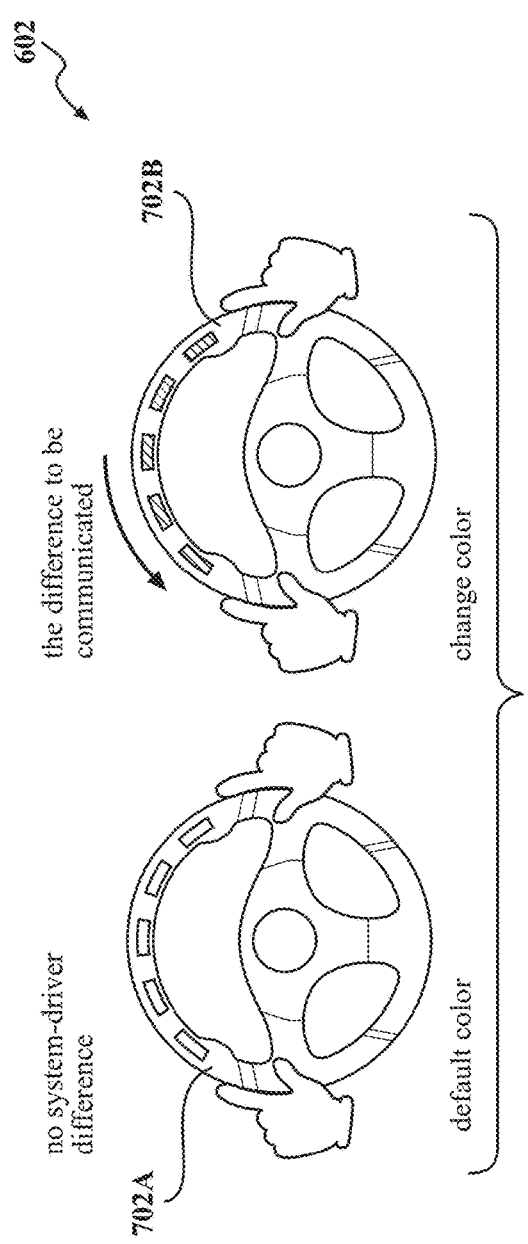

Referring now to FIG. 7A, the steering apparatus 180 according to the first embodiment 602 is illustrated. At 702A, when the current angle and the recommended angle of the steering apparatus 180 are the same (i.e., the difference is 0°) or within a threshold range of one another, the visual feedback module 230 causes the lighting elements 330 to be illuminated in a default color. At 702B, when the current angle and the recommended angle of the steering apparatus 180 are not the same (i.e., the difference is non-zero) or are not within the threshold range of one another, the visual feedback module 230 causes the lighting elements 330 to be illuminated in a first color, where the first color is different than the default color.

Figure 7B:
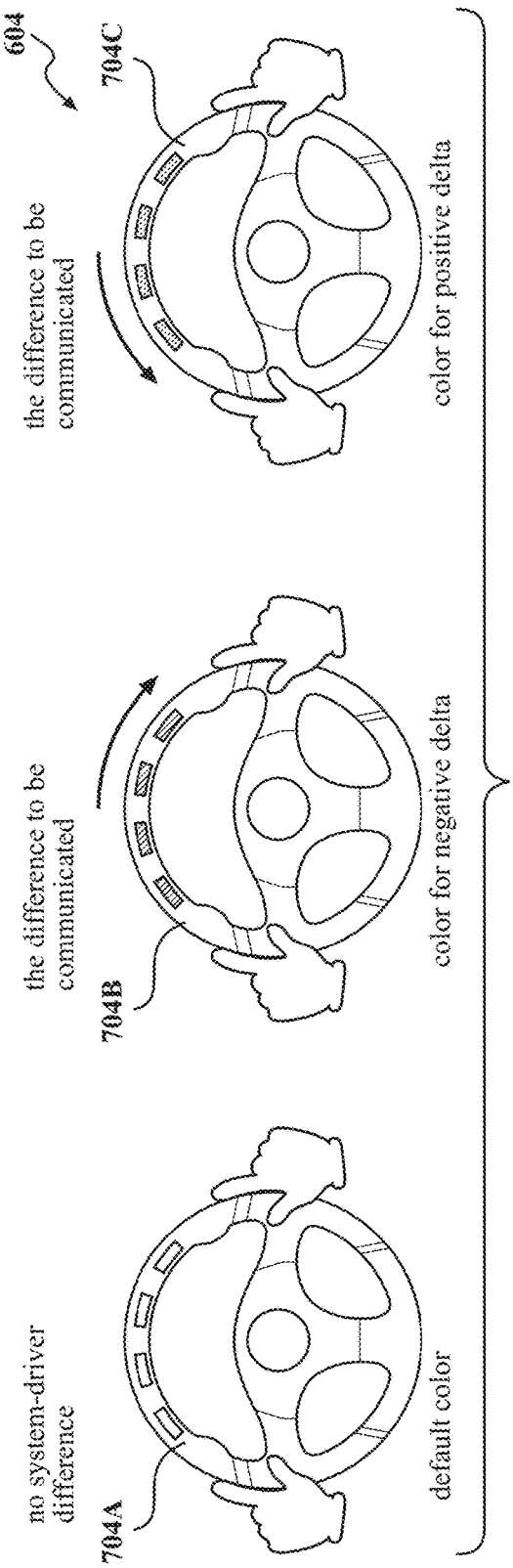

Referring now to FIG. 7B, the steering apparatus 180 according to the second embodiment 604 is illustrated. At 704A, when the current angle and the recommended angle of the steering apparatus 180 are the same (i.e., the difference is 0°) or within a threshold range of one another, the visual feedback module 230 causes the lighting elements 330 of the steering apparatus 180 to be illuminated in a default color. At 704B, when the difference has a first sign (e.g., a positive sign), the visual feedback module 230 causes the lighting elements 330 to be illuminated in a first color, where the first color is different than the default color. At 704C, when the difference has a second sign (e.g., a negative sign), the visual feedback module 230 causes the lighting elements 330 to be illuminated in a second color, where the second color is different than the default color and different than the first color.

Referring now to FIG. 7C, the steering apparatus 180 according to the third embodiment 606 is illustrated. At 706A, when the current angle and the recommended angle of the steering apparatus 180 are the same (i.e., the difference is 0°) or within a threshold range of one another, the visual feedback module 230 causes the lighting elements 330 of the steering apparatus 180 to be illuminated in a default color. At 706B, when the difference has a first sign (e.g., a positive sign), the visual feedback module 230 causes first lighting elements in a first region of the steering apparatus 180 to be illuminated in a color that is different than the default color while second lighting elements in a second region of the steering apparatus 180 remain illuminated in the default color. The first lighting elements and the second lighting elements are included in the lighting elements 330. At 706C, when the difference has a second sign (e.g., a negative sign), the visual feedback module 230 causes the second lighting elements in the second region to be illuminated in the color while the first lighting elements in the first region remain illuminated in the default color. The visual feedback module 230 selects the first region and the second region based upon the sign of the difference.

Referring now to FIG. 7D, the steering apparatus 180 according to the fourth embodiment 608 is illustrated. At 708A, when the current angle and the recommended angle of the steering apparatus 180 are the same (i.e., the difference is 0°) or within a threshold range of one another, the visual feedback module 230 causes first lighting elements in a first region of the steering apparatus 180 and second lighting elements in a second region of the steering apparatus 180 to be illuminated in a default color. At 708B, when the difference has a first sign (e.g., a positive sign), the visual feedback module 230 causes the first lighting elements in the first region to be illuminated in a first color and the second lighting elements in the second region to be illuminated in a second color, where the first color and the second color are different than the default color and where the first color and second color are different. At 708C, when the difference has a second sign (e.g., a negative sign), the visual feedback module 230 causes the first lighting elements in the first region to be illuminated in the second color and the second lighting elements in the second region to be illuminated in the first color. In an example, the first color is associated with moving a hand of the operator upwards while the hand remains on the steering apparatus 180 and the second color is associated with moving the hand downwards while the hand remains on the steering apparatus 180. The visual feedback module 230 selects the first region and the second region based upon the sign of the difference. The first lighting elements and the second lighting elements are included in the lighting elements 330.

Figure 8:
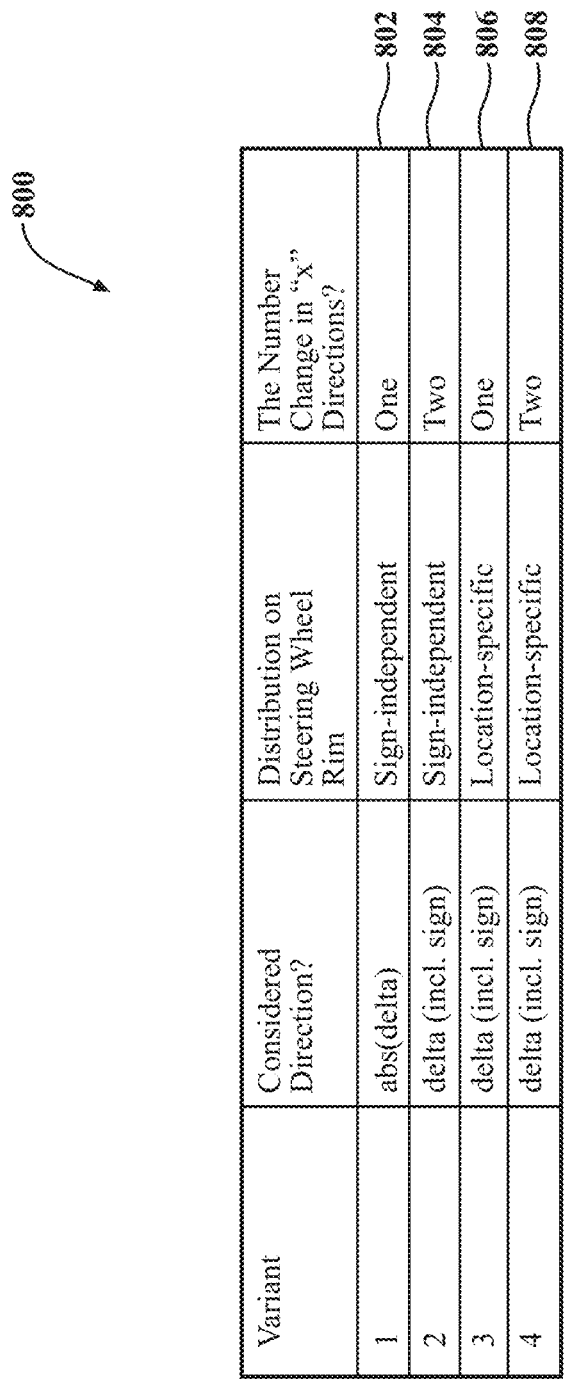
FIG. 8 illustrates a table that details different variants of recommending a steering angle change using different numbers of lighting elements.

With reference now to FIG. 8, a table 800 is illustrated which details various embodiments of the visual assistance system 170 and the steering apparatus 180 in which a number of illuminated lighting elements in one or more regions of the steering apparatus 180 is changed to communicate a difference between a current steering angle and a recommended steering angle.

In a first embodiment 802, the visual assistance system 170 utilizes an absolute value of a difference (referred to in FIG. 8 as "delta") between a current angle and a recommended angle of the steering apparatus 180, distribution of lighting on the steering apparatus 180 is independent of a sign of the difference, and a number of lighting elements illuminated is changed in one direction. In a second embodiment 804, the visual assistance system 170 utilizes the difference (including the sign of the difference) between the current angle and the recommended angle of the steering apparatus 180, the distribution of lighting on the steering apparatus 180 is independent of the sign of the difference, and the number of lighting elements illuminated is changed in two directions. In a third embodiment 806, the visual assistance system 170 utilizes the difference (including the sign of the difference) between the current angle and the recommended angle of the steering apparatus 180, the distribution of lighting on the steering apparatus 180 is location-specific, and the number of lighting elements is changed in one direction. In a fourth embodiment 808, the visual assistance system 170 utilizes the difference (including the sign of the difference) between the current angle and the recommended angle of the steering apparatus 180, the distribution of lighting on the steering apparatus 180 is location-specific, and the number of lighting elements is changed in two directions.

Referring now to FIG. 9A, the steering apparatus 180 according to the first embodiment 802 is illustrated. At 902A, when the current angle and the recommended angle of the steering apparatus 180 are the same (i.e., the difference is 0°) or within a threshold range of one another, the visual feedback module 230 does not cause any of the lighting elements 330 to be illuminated. Alternatively, at 902B, when the current angle and the recommended angle of the steering apparatus 180 are the same (i.e., the difference is 0°), the visual feedback module 230 causes a default number of the lighting elements 330 to be illuminated. At 902C, when the current angle and the recommended angle of the steering apparatus 180 are not the same (i.e., the difference is non-zero) or are not within the threshold range of one another, the visual feedback module 230 causes a number of the lighting elements 330 to be illuminated. In scenarios in which none of the lighting elements 330 are illuminated by default, such as in 902A, the number of lighting elements 330 is non-zero. In scenarios in which the default number of lighting elements 330 are illuminated, such as in 902B, the number of lighting elements 330 is greater than zero and different than the default number of the lighting elements 330.

Referring now to FIG. 9B, the steering apparatus 180 according to the second embodiment 804 is illustrated. At 904A, when the current angle and the recommended angle of the steering apparatus 180 are the same (i.e., the difference is 0°) or within a threshold range of one another, the visual feedback module 230 causes a default number of the lighting elements 330 to be illuminated. At 904B, when the difference has a first sign (e.g., a negative sign), the visual feedback module 230 selects and causes a first number of the lighting elements 330 to be illuminated. In the example in 904B, the first number of the lighting elements 330 is less than the default number of the lighting elements 330 and illuminating the first number of the lighting elements 330 includes unilluminating a portion of the default number of the lighting elements 330. At 904C, when the difference has a second sign (e.g., a positive sign), the visual feedback module 230 selects and causes a second number of the lighting elements 330 to be illuminated. In the example in 904C, the second number of the lighting elements 330 is greater than the default number of the lighting elements 330 and illuminating the second number of the lighting elements 330 comprises illuminating a group of the lighting elements 330 in addition to the (already illuminated) default number of the lighting elements 330.

Figure 9C:
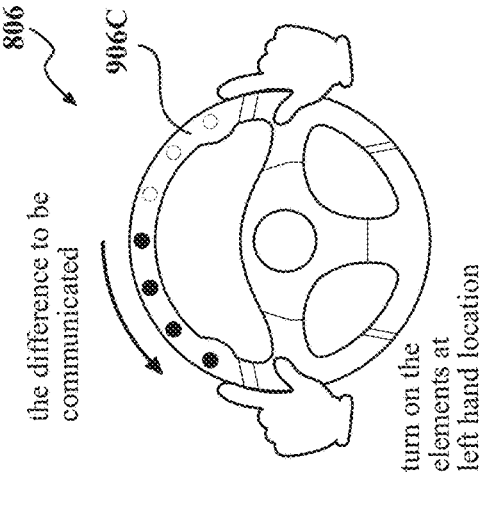
Figure 9C:
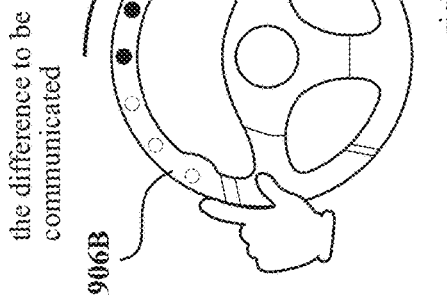
Figure 9C:
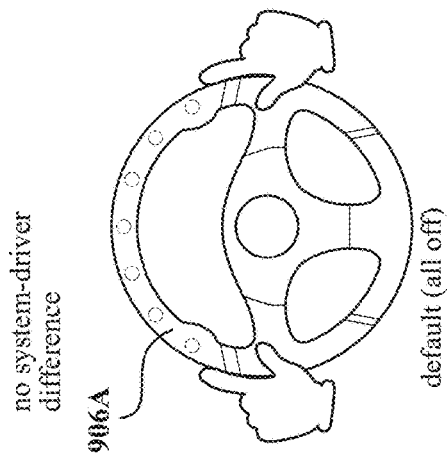

Referring now to FIG. 9C, the steering apparatus 180 according to the third embodiment 806 is illustrated. At 906A, when the current angle and the recommended angle of the steering apparatus 180 are the same (i.e., the difference is 0°) or within a threshold range of one another, the visual feedback module 230 does not cause any of the lighting elements 330 to be illuminated. At 906B, when the difference has a first sign (e.g., a positive sign), the visual feedback module 230 selects a first number of the lighting elements 330 in a first region of the steering apparatus 180 and causes the first number of the lighting elements 330 to be illuminated. The visual feedback module 230 selects the first region based upon the first sign and/or a position of a hand or hands of the operator on the steering apparatus 180. At 906C, when the difference has a second sign (e.g., a negative sign), the visual feedback module 230 selects a second number of the lighting elements 330 in a second region of the steering apparatus 180 and causes the second number of the lighting elements 330 to be illuminated. The visual feedback module 230 selects the second region based upon the second sign and/or the position of the hand or hands of the operator on the steering apparatus 180.

Figure 9D:
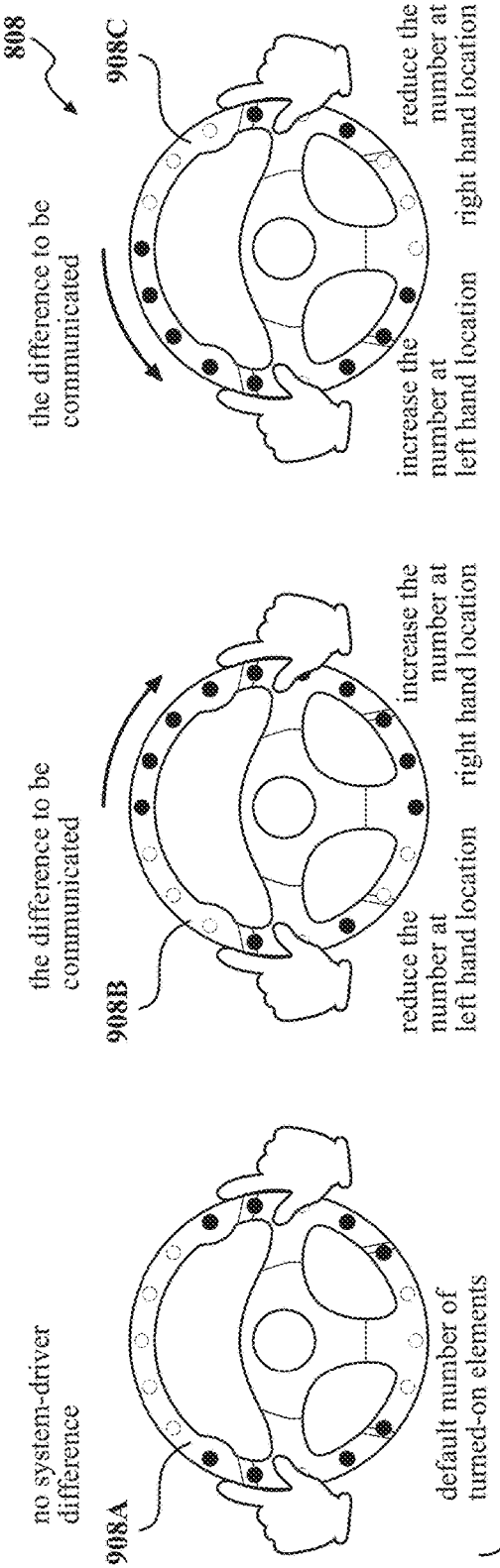

Referring now to FIG. 9D, the steering apparatus 180 according to the fourth embodiment 808 is illustrated. At 908A, when the current angle and the recommended angle of the steering apparatus 180 are the same (i.e., the difference is 0°) or within a threshold range of one another, the visual feedback module 230 selects a first default number of the lighting elements 330 in a first region of the steering apparatus 180 and a second default number of the lighting elements 330 in a second region of the steering apparatus 180. The visual feedback module 230 causes the first default number of the lighting elements 330 and the second default number of the lighting elements 330 to be illuminated. At 908B, when the difference has a first sign (e.g., a positive sign), the visual feedback module 230 selects a first number of the lighting elements 330 in the first region for unillumination and a second number of the lighting elements 330 in the second region for illumination. In the example shown in 908B, the visual feedback module 230 increases a number of the lighting elements 330 illuminated in the second region from the second default number of the lighting elements 330 and decreases a number of the lighting elements 330 illuminated in the first region from the first default number of the lighting elements 330. At 908C, when the difference has a second sign (e.g., a negative sign), the visual feedback module 230 selects a first number of the lighting elements 330 in the first region for illumination and a second number of the lighting elements 330 in the second region for unillumination. In the example shown in 908C, the visual feedback module 230 increases a number of the lighting elements 330 illuminated in the first region from the first default number of the lighting elements 330 and decreases a number of the lighting elements 330 illuminated in the second region from the second default number of the lighting elements 330.

Figure 10:
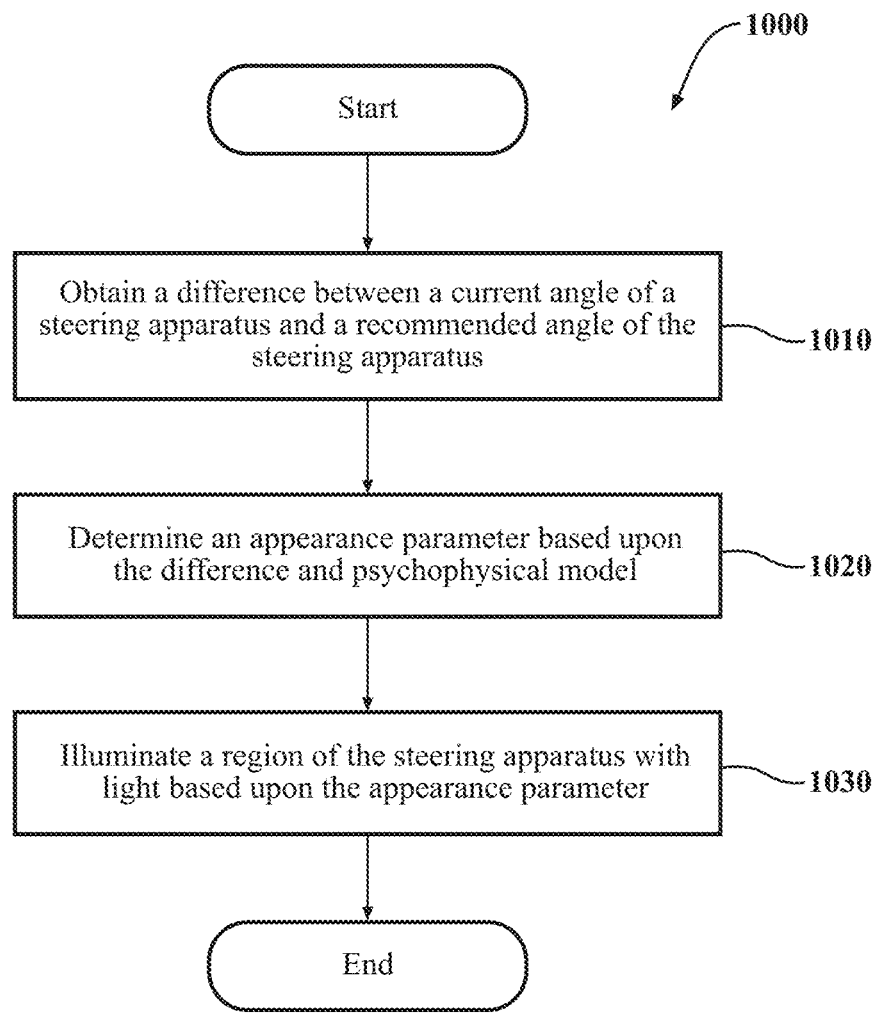
FIG. 10 illustrates one embodiment of a method that is associated with recommending a steering angle change using a psychophysical model.

Additional aspects of the visual feedback system 170 will be discussed in relation to FIG. 10. FIG. 10 illustrates a flowchart of a method 1000 that is associated with recommending a steering angle using a psychophysical model. The method 1000 will be discussed from the perspective of the visual feedback system 170 of FIGS. 1, and 2. While method 1000 is discussed in combination with the visual feedback system 170, it should be appreciated that the method 1000 is not limited to being implemented within the visual feedback system 170 but is instead one example of a system that may implement the method 1000.

At 1010, the visual feedback system 170 obtains a difference between a current angle of the steering apparatus 180 and a recommended angle of the steering apparatus 180. In an example, the visual feedback system 170 obtains the recommended angle from the navigation system 147 or the ADAS 148 of the vehicle 100. According to some embodiments, the visual feedback system 170 determines a position of a hand of an operator of the vehicle 100 on the steering apparatus 180 based upon sensor data generated by the hand position sensor 330.

At 1020, the visual feedback system 170 determines an appearance parameter based upon the difference and the psychophysical model 260. The psychophysical model 260 optimizes a relationship between perceived light and the difference such that a change in the difference produces a proportional change in the perceived light. In an example, the appearance parameter includes at least one of hue, lightnesss, brightness, chroma, colorfulness, or saturation.

At 1030, the visual feedback system 170 illuminates a region of the steering apparatus 180 with light based upon the appearance parameter. According to embodiments, the visual feedback system 170 selects the region based upon the position of the hand of the operator on the steering apparatus 180 and/or a sign (e.g., a positive sign or a negative sign) of the difference. According to embodiments, as the operator rotates the steering apparatus 180 from the current angle to the recommended angle, the visual feedback system 170 varies the appearance parameter such that the light appears different to the operator to indicate a decrease in the difference. In an example, when the steering apparatus 180 has been rotated such that the current angle equals the recommended angle (or is within a threshold angle of the recommended angle), the visual feedback system 170 unilluminates the region, thereby indicating to the operator that the vehicle 100 is traveling in a recommended direction.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle 100 is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle 100 to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

According to embodiments, the vehicle systems 140 include an advanced driver-assistance system (ADAS) 148. The ADAS 148 includes one or more of adaptive cruise control (ACC), an anti-lock braking system (ABS), an automotive night vision system, a backup camera, a blind spot monitor, a collision avoidance system, a crosswind stabilization system, cruise control, an electronic stability control (ESC) system, a forward collision warning (FCW) system, an intersection assistant system, an intelligent speed adaptation system, a lane centering system, a lane departure warning system (LDW), a lane change assistance system, parking sensors, a pedestrian protection system, rain sensors, tire pressure monitoring, a traction control system, a traffic sign recognition system, and/or a wrong-way driving warning.

The processor(s) 110, the visual feedback system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the visual feedback system 170, and/or the autonomous driving module(s) 160 may control some or all of these vehicle systems 140 and, thus, may be partially or fully autonomous.

The processor(s) 110, the visual feedback system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-10, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A computing system for providing visual feedback on a steering apparatus of a vehicle, the computing system comprising:
    a processor; and
    memory communicably coupled to the processor and storing instructions that, when executed by the processor, cause the processor to:
        obtain a difference between a current angle of the steering apparatus and a recommended angle of the steering apparatus;
        determine an appearance parameter based upon the difference and a psychophysical model stored in the memory, wherein the psychophysical model optimizes a relationship between perceived light and the difference such that a change in the difference produces a proportional change in the perceived light; and
        illuminate a region of the steering apparatus with light based upon the appearance parameter.

2. The computing system of claim 1, wherein the instructions for illuminate the region of the steering apparatus with the light based upon the appearance parameter comprise further instructions that cause the processor to activate at least one light emitting diode (LED) comprised by the steering apparatus, wherein the at least one LED emits the light.

3. The computing system of claim 1, wherein the psychophysical model comprises a perceptually uniform color map.

4. The computing system of claim 1, wherein the instructions further cause the processor to:
    obtain sensor data that is indicative of an ambient light level within a cabin of the vehicle, wherein illuminate the region of the steering apparatus with the light is additionally based upon the sensor data.

5. The computing system of claim 1, wherein the instructions further cause the processor to:
    subsequent to illuminate the region of the steering apparatus with the light based upon the appearance parameter, obtain a second difference between a second current angle of the steering apparatus and the recommended angle of the steering apparatus, wherein the second current angle is between the current angle and the recommended angle;
    determine a second appearance parameter based upon the second difference and the psychophysical model stored in the memory; and
    illuminate the region of the steering apparatus with second light based upon the second appearance parameter.

6. The computing system of claim 5, wherein the light is associated with a first set of points defined by a first tolerance contour within a color space, wherein the second light is associated with a second set of points defined by a second tolerance contour within the color space, wherein the first tolerance contour makes contact with the second tolerance contour within the color space.

7. The computing system of claim 1, wherein the appearance parameter includes at least one of:
    hue;
    lightnesss;
    brightness;
    chroma;
    colorfulness; or
    saturation.

8. The computing system of claim 1, wherein the region is selected based upon a position of a hand of an operator of the vehicle on the steering apparatus.

9. A non-transitory computer-readable medium for providing visual feedback on a steering apparatus of a vehicle and including instructions that, when executed by a processor, cause the processor to:
    obtain a difference between a current angle of the steering apparatus and a recommended angle of the steering apparatus;

determine an appearance parameter based upon the difference and a psychophysical model, wherein the psychophysical model optimizes a relationship between perceived light and the difference such that a change in the difference produces a proportional change in the perceived light; and illuminate a region of the steering apparatus with light based upon the appearance parameter.

10. The non-transitory computer-readable medium of claim 9, wherein the appearance parameter is based upon a sign of the difference.

11. The non-transitory computer-readable medium of claim 9, wherein the instructions further cause the processor to:

prior to illuminate the region, select the region based upon a sign of the difference.

12. The non-transitory computer-readable medium of claim 9, wherein the instructions for determine the appearance parameter based upon the difference and the psychophysical model comprise further instructions that cause the processor to:

determine a Red Green Blue (RGB) value based upon the difference; and determine the appearance parameter based upon the RGB value and the psychophysical model.

13. The non-transitory computer-readable medium of claim 9, wherein the instructions for illuminate the region of the steering apparatus with the light based upon the appearance parameter comprise further instructions that cause the processor to change a brightness of the region from a first brightness to a second brightness.

14. A method comprising:

obtaining a difference between a current angle of a steering apparatus and a recommended angle of the steering apparatus;

determining an appearance parameter based upon the difference and a psychophysical model, wherein the psychophysical model optimizes a relationship between perceived light and the difference such that a change in the difference produces a proportional change in the perceived light; and illuminating a region of the steering apparatus with light based upon the appearance parameter.

15. The method of claim 14, wherein a color of the light is based upon a sign of the difference.

16. The method of claim 14, further comprising:

prior to illuminating the region, determining a position of a hand on the steering apparatus based upon sensor data generated by a sensor comprised by the steering apparatus;

determining a sign of the difference; and selecting the region based upon the position of the hand and the sign of the difference.

17. The method of claim 14, wherein the difference is obtained from an advanced driver assistance-system (ADAS) of a vehicle that includes the steering apparatus.

18. The method of claim 14, wherein the difference is obtained from a navigation system of a vehicle that includes the steering apparatus.

19. The method of claim 14, wherein the appearance parameter varies as the steering apparatus is rotated from the current angle to the recommended angle.

20. The method of claim 14, further comprising:

subsequent to illuminating the region, determining that the steering apparatus has been rotated such that the current angle is the recommended angle; and unilluminating the region based upon the current angle being the recommended angle.

* * * * *